United States Patent
Aota et al.

(10) Patent No.: US 6,676,725 B2
(45) Date of Patent: Jan. 13, 2004

(54) COLD BONDED IRON PARTICULATE PELLETS

(75) Inventors: Jay Aota, Kanata (CA); Lucie Morin, Aylmer (CA)

(73) Assignee: Her Majesty the Queen in right of Canada as represented by the Minister of Natural Resources, Ottawa (CA)

( * ) Notice: Subject to any disclaimer, the term of this patent is extended or adjusted under 35 U.S.C. 154(b) by 0 days.

(21) Appl. No.: 10/122,244

(22) Filed: Apr. 16, 2002

(65) Prior Publication Data

US 2002/0152839 A1 Oct. 24, 2002

Related U.S. Application Data

(63) Continuation-in-part of application No. 09/431,263, filed on Nov. 1, 1999, now Pat. No. 6,409,964.

(51) Int. Cl.$^7$ .............................................. C04B 35/10
(52) U.S. Cl. ........................ 75/246; 75/746; 75/770; 75/773
(58) Field of Search ...................... 75/246, 746, 770, 75/773

(56) References Cited

U.S. PATENT DOCUMENTS

| | | |
|---|---|---|
| 3,174,846 A | 3/1965 | Brisse et al. |
| 3,264,090 A | 8/1966 | Swartz |
| 3,437,474 A | 4/1969 | Imperato |
| 3,490,895 A | 1/1970 | Svensson |
| 4,846,884 A | 7/1989 | Shigematsu et al. |
| 4,915,740 A * | 4/1990 | Sakai et al. ............... 106/104 |
| 5,066,327 A | 11/1991 | Yanaka et al. |
| 5,302,186 A | 4/1994 | Field et al. |
| 5,439,505 A | 8/1995 | Krofchak |
| 5,584,926 A * | 12/1996 | Borgholm et al. .......... 106/713 |
| 5,589,118 A | 12/1996 | Ford, Jr. et al. |
| 5,685,893 A | 11/1997 | Field et al. |
| 5,858,057 A | 1/1999 | Celada-Gonzalez et al. |
| 6,024,791 A * | 2/2000 | Sonoda et al. ............... 106/714 |
| 6,409,964 B1 * | 6/2002 | Aota et al. ..................... 419/19 |

FOREIGN PATENT DOCUMENTS

| | | |
|---|---|---|
| CA | 2061548 | 10/1992 |
| CA | 2126781 | 12/1997 |
| CA | 2240706 | 12/1998 |

OTHER PUBLICATIONS

Sinochem Guangdong ; Polyfect SPP–2 Superplasticizer for Concrete.
Greenkon: High Performance Castables, 1980.
New Type Alumina Castables; S.B. Lasday, Industrial Heating, Apr. 1985 pp. 28, 30.
Fundamentals of Cold Bonded Processes; M.A. Goksel, Agglomeration 77, pp. 877–899.
Control of the Properties of Cold–Bonded Pellets; B. Hassler, Stahl und Eisen, 95, No 16, pp. 725–733 (1975).
Operation of a New Pelletising Process; F.T.C. Doughty; Iron and Steel International, Dec. 1975, pp. 443–447.

* cited by examiner

*Primary Examiner*—Daniel J. Jenkins
(74) *Attorney, Agent, or Firm*—Robert A. Wilkes; Shapiro Cohen

(57) ABSTRACT

Shaped bodies containing particulate iron materials, such as cast pellets, briquettes and the like, with sufficient strength to withstand temperatures of up to at least 1000° C. can be obtained by using a fully hydrated high-alumina cement as the binder. The strength of the pellets at elevated temperatures can be further enhanced by adding small amounts of bentonite, silica fume or other suitable supplementary cementing materials, and super plasticizer. The iron particulate materials, typically having a size range of from about 0.01 mm to 6 mm, include ore fines, sinter fines, BOF and EAF dusts, mill scale, and the like. Powdered carbonaceous material, such as ground coal or coke, may also be added to the pellets. The shaped bodies are suitable for use in blast furnaces, basic oxygen furnaces, and in DRI processes.

12 Claims, No Drawings

COLD BONDED IRON PARTICULATE PELLETS

This application is a continuation-in-part application of U.S. application Ser. No. 09/431,263 filed Nov. 1, 1999, now U.S. Pat. No. 6,409,964.

FIELD OF THE INVENTION

This invention relates to cold bonded pellets which contain a significant amount of an iron particulate material, which can be used as the feed material to a furnace for producing iron. The pellets are made from "iron particulate material", which, in addition to referring to iron ore powder as such, for example haematite powder, sinter feed fines, sinter fines, and ore concentrate fines, also includes a wide variety of particulate materials derived from iron smelting processes which contain significant amounts of recoverable ferrous values, such as electric arc furnace (EAF) dust, basic oxygen furnace (BOF) dust, mill scale, and the like. At present, the use of at least some of these materials in commercial iron smelting techniques presents significant problems.

BACKGROUND OF THE INVENTION

Pellets containing particulate iron ore are used as a component of the feed in blast furnaces and DRI (direct reduced iron) furnaces. Commercially available iron ore pellets are formed by heat induration at temperatures of approximately 1300° C. However, the heat-induration method has a number of drawbacks: the cost of production is high due to capital and maintenance expenditures on high temperature furnaces, and large amounts of energy are needed for the high temperatures used.

Several attempts have been made to use iron ore fines in DRI furnaces, such as the Iron Carbide Process, in which the particle size of the iron ore used must fall within a range suitable for bed fluidization, i.e. 0.1 mm to 1.0 mm, with a tolerance of about 5%; and processes using coal-bearing pellets such as the FASTMET process, in which the fines used must have a size range that is suitable for making strong green pellets, i.e. <0.44 mm. However, these methods utilize only a narrow range of particle sizes, and therefore generate a significant amount of undersized waste. Several attempts have been made to develop a process for cold bonding iron ore pellets using either calcium silicate, limestone-silica, calcium carbonate, or organic glue as a binder, e.g. F.T.C. Doughty, "Operation of a New Pelletizing Process", Iron and Steel International, December 1975; B. Hassler, "Control of the Properties of Cold-Bound Autoclaved Pellets", Stahl und Eisen 95 (1975) Nr. 16. However, cold bonded iron ore pellets have not been commercially successful because the binders used are not heat resistant, and the pellets disintegrate when heated above 700° C., thus causing difficulties in the blast furnace environment.

It has also been proposed to use a Portland cement type binder to agglomerate iron ore powders using balling or briquetting techniques, for example in U.S. Pat. Nos. 3,264,090 and 4,846,884. In these methods, only a low amount of water is used, which appears to result in a product which is an outer shell bonded together by the Portland cement binder, with more or less loose unbonded powder inside. These products have the disadvantage that the Portland cement based binder is not able to withstand the temperatures of the blast furnace environment, with the result that above about 700° C. the Portland cement bonds start to disintegrate and release iron ore powder into the gas flows in the furnace. An alternative complex process in which a binder comprising a mixture of styrene or acrylonitrile and vinyl polymers is used together with an aluminosilicate binder, such as Kayolite, and hydrochloric acid is described in U.S. Pat. No. 5,589,118.

Accordingly, it is desirable to develop an iron ore pellet product which can contain a broader range of iron ore particle sizes, and which also can contain particulate ferriferous materials other than ore powders, and in particular both EAF and BOF dusts.

SUMMARY OF THE INVENTION

Accordingly, this invention seeks to provide a cold bonded iron pellet product suitable for use in iron smelting procedures, including blast furnaces and DRI furnaces, which are rugged enough to withstand the furnace environment.

This invention in its broadest embodiment provides the product of a process in which an iron particulate material is mixed together with water and sufficient particulate high-alumina cement binder. The wetted mixture is then converted into shaped bodies such as pellets, briquettes, balls, and the like by conventional methods, or cast into moulds. After curing and drying, the shaped bodies can be fed to the furnace. Unlike at least some of the known processes for producing, for example, pellets, it appears that almost any iron particulate material of a suitable size can be used in the process of this invention. The amount of binder used is adjusted to provide a shaped body such as a pellet, briquette or ball with adequate strength to withstand the aggressive conditions which exist in an iron producing furnace environment, especially blast and DRI furnaces. The amount of water used is adjusted to suit the shaping procedure used, but is always at least enough to ensure complete hydration, and consequently complete setting, of the high-alumina cement binder. This ensures that the cement bond extends throughout the final shaped product, thus avoiding the formation of a cemented shell with more or less loose powder material trapped inside. Ideally, the shaped bodies after the cement has set are a coherent mass throughout. With proper choice of both the amount of water, and the amount of cement binder, cured pellets with adequate mechanical strength to survive a furnace environment which will smelt adequately to provide iron can be obtained.

DETAILED DESCRIPTION OF THE INVENTION

In a first broad embodiment, this invention seeks to provide a solid shaped body comprising from about 70% to about 97% of iron particulate material bonded together with from about 3% to about 30% of fully hydrated and set high-alumina cement.

In a second broad embodiment, this invention seeks to provide a solid shaped body comprising from about 75% to about 97% of iron particulate material and from about 5% to about 25% of a particulate carbonaceous material bonded together with from about 3% to about 15% of fully hydrated and set high-alumina cement.

The cold bonded iron ore pellet product of this invention is prepared by a process including the steps of:

(a) mixing together to provide a substantially homogenous dry mixture from about 70% to about 97% of an iron particulate material having a size of less than about 6 mm, and from about 3% to about 30% of particulate high-alumina cement binder;

(b) adding to the mixture from step (a) at least sufficient water to fully hydrate the high-alumina cement binder;

(c) converting the mixture from step (b) into a homogenous mixture;

(d) converting the mixture from step (c) into green shaped bodies; and (e) drying and curing the green shaped bodies.

Preferably, the drying and curing of step (e) is carried out in a dryer at a temperature of at least about 100° C. Alternatively, step (e) comprises curing at about 20° C. for about 24 hours, followed by heating in a dryer at a temperature of about 100° C.

Preferably, the iron particulate material consists of a mixture of coarse particles having a size range of from about 0.1 mm to about 6 mm, and fine particles having a size of less than 0.1 mm. Most preferably, the iron particulate material includes up to 20% by weight of coarse particles having a size of about 0.1 mm to about 6 mm, the remainder being fine particles having a size of less than about 0.1 mm.

When a cold bonded product including a carbon source is desired, the carbon source material, such as ground coal or coke, is added to the dry material produced in step (a) of the process.

In a third broad embodiment this invention seeks to provide cold bonded shaped bodies containing:

from about 70% to about 97% by weight iron particulate material from about 3% to about 30% fully hydrated and set high-alumina cement, together with, based on the total weight of iron particulate material and high-alumina cement:

from 0% to about 5.0% bentonite and from 0% to about 5.0% supplementary cementing materials as designated in CSA Standard A23.5; and from 0% to about 3% by weight based on the total weight of the mixture of a water reducing strength increasing admixture for concrete;

wherein the iron particulate material includes from about 3% to about 80% by weight of coarse particles having a size range of from about 0.1 mm to about 6 mm, and from about 20% to about 97% by weight of fine particles having a size of less than 0.1 mm.

Preferably, the supplementary cementing material chosen from CSA Standard A23.5 is silica fume.

Preferably, the supplementary cementing materials include or comprise a water reducing admixture in an appropriate amount. Most preferably, the water reducing admixture is a super plasticizer, such as sodium naphthalene sulphonate, and is present in an amount of up to 1 part per 100 parts of dry mixture.

In preparing the cold bonded particulate iron products of this invention there are two factors which have to be balanced.

The first is the weight ratio between the particulate iron material and the high-alumina cement. Since high-alumina cement is relatively expensive, it is desirable to minimise the quantity required. It has been found that the quantity required is, to some extent, dependant on the iron particulate material being used. The amount to be used should be enough to ensure that all of the particulate material is cemented together, and to give adequate strength properties in the cured shaped bodies. For different iron particulate material feedstocks, or mixtures of feedstocks, it can therefore be expected that the amount of high-alumina cement required might vary. An amount of less than about 3% has been found not to provide adequately strong shaped bodies after curing and drying; an amount above about 30% does not appear to provide any meaningful strength increase in the cured shaped bodies. In this context, an adequate strength appears to be a crushing strength, measured on individual essentially spherical pellets under standard conditions, of greater than 500N. A pellet is placed between two platens and the resulting crushing strength measured directly (see ISO 4700, Crushing Strength Test). In the products of this invention it is possible to obtain crushing strengths in the range of from about 1,000N up to least about 2,000N.

The second is the amount of water to be used. If the amount of water is less than the amount required to fully hydrate the high-alumina cement, the properties of the cured shaped body, for example crushing strength, are adversely affected, and it is also found that the shaped bodies will likely contain at least some more or less loose and uncemented powder, which is not desirable. It is also found that the weight ratio of water to the combination of iron particulate material and high-alumina cement depends on the process to be used to make the shaped bodies, and whether or not a water reducing agent is used. At one end of the range, the amount of water used is about 20% by weight. At this amount of water, a flowable slurry is obtained which can be cast into shaped moulds, using conventional concrete preparation and handling techniques, including vibration casting, to ensure complete filling of the mould and the elimination of voids from the slurry. Since these cast shapes will still contain free water when the cement has set, it is preferred to dry and cure the castings at about 20° C. for about 24 hours before oven drying at about 100° C. At the other end of the range, as low as about 3% water can be used, coupled with vibration casting into suitable shapes. In vibration casting, what appears to be a relatively "dry" powder is fluidised by the vibration, and, under the effect of surface tension forces, is transformed into a shaped body. Since castings prepared in this fashion contain the least water, drying at about 20° C. is usually not found to be necessary, and the shaped bodies can be directly oven dried and cured. In between these, other levels of water are used to prepare briquettes, using a conventional two roll technique, to prepare pellets, or to prepare substantially spherical shapes by conventional balling techniques. Extruded pellets can also be obtained by combining conventional extrusion techniques with vibration casting. A relatively "dry" mixture is subjected to vibration fluidisation during extrusion, and the green extrudate chopped into suitable length pellets. The pellets can then be directly oven cured and dried.

As a general guide, the following amounts of water have been found to be effective:

vibration casting: about 5–7%;

briquette pressing: about 10%;

balling using a rotating plate method: about 16%;

slurry casting: from about 10% up to about 20%.

Any conventional mixing technique, either batchwise or continuous, can be used. For example, for a batchwise fluid casting procedure, a conventional concrete mixer appears to be appropriate.

In products which contain a carbonaceous material, the carbonaceous material is preferably coal, which is ground or crushed to a particle size of less than about 0.5 mm.

An advantage of the cold bonded pellets of the present invention is that induration of the green shapes in a furnace at a temperature of 1300° C. is not required. Since the amount of water can be kept close to the minimum required to fully hydrate the high-alumina cement, less energy is required in the curing and drying step in which the cement sets, and in which remaining water is substantially removed. With a water content toward the upper end of the desired range, a drying step carried out over about 24 hours at ambient temperatures of about 20° C. is desirable. During this setting and initial drying step, the shaped bodies develop significant strength and can be handled easily. After this initial setting and drying step, or if the water content is such that this step can be omitted, the shaped bodies are dried in a ventilated oven at a temperature somewhat above about 100° C.

A further advantage is that the cold bonded pellets of the present invention show sufficient strength at elevated temperatures for use in conventional blast furnaces and, when a suitable carbonaceous material such as powdered coal is included in the pellet mix, in DRI furnaces. The strength of the pellets at elevated temperatures can be further enhanced by adding small amounts of bentonite, by adding a supplementary cementing material, and the water requirements can be lessened by the use of a water reducing admixture, such as super plasticizer. These materials are well known in concrete casting technology. Suitable supplementary cementing materials include silica fume, colloidal silica, and other supplementary cementing materials designated in CSA Standard A23.5.

In the present invention, the dry ingredients from which the shaped bodies are to be made are mixed together in the weight percentage ratios indicated, to form a dry mixture. Generally, the iron particulate material will include materials both of differing sizes, and from more than one source, such as a combination of iron ore material fines with steel mill wastes, mill scale, BOF dust, EAF dust and ore sinter fines.

The dry mixture is conveniently mixed using conventional equipment: for example, for a batch process concrete mixing equipment is satisfactory. The required amount of water is added to the dry mixture, and the mixer is operated until a substantially homogenous mixture is obtained. The mixture is then shaped by the chosen method.

In a typical example, the following ingredients were mixed together in the approximate ratios provided below to form a dry mixture; this mixture is described below as the "Optimum Mixture".

|  | Parts by Weight |
| --- | --- |
| Coarse iron ore | 59.5 |
| Fine iron ore | 32.0 |
| High-alumina cement | 7.0 |
| Bentonite | 0.6 |
| Silica Fume | 0.9 |
| Super Plasticizer | 0.14. |

The iron ore used was a mixture of sinter plant feed, and ore concentrate fines. The coarse material had a size range of from about 0.1 mm to about 1.0 mm, and the fine material had a size of less than 0.02 mm.

The dry mixture was processed into pellets as described above. To provide pellets suitable for a DRI process, 15 parts by weight of ground coal was added to the same dry mixture of ingredients.

The cold bonded pellets of the present invention have superior strength at elevated temperatures of at least 1000° C. compared to conventional cold bonded pellets. The crushing strength of pellets containing the following three different binder systems was measured: (i) 10% calcium silicate; (ii) 7% high-alumina cement; and (iii) 7% high-alumina cement, 0.14% Super Plasticizer, 0.6% bentonite, and 0.9% Silica fume. All three types of pellets were made using the following procedure: the iron ore particulates were mixed in a small laboratory mixer with the other solids to form a dry mixture; 5 to 6 weight percent water was added to the dry mixture, and the mixture was kneaded. The mixture was then cast into pellet moulds by a vibration casting method to form cylindrical pellets with of about 2 cm diameter and length. The pellets were left in the mould for 16 hours, removed, and dried at 110° C. for 16 hours. Pellet strength was tested by heating the pellets in an air atmosphere at elevated temperatures for 30 minutes, cooling them to room temperature, and then measuring crushing strength. In this context, the "crushing strength", measured in Newtons, refers to the total compressive load required to fracture the sample.

The following experimental data indicate that the pellets of the present invention are five times stronger after heat treatment at 1000° C. than conventional iron ore pellets made with silicate bonding. The same mixture of iron particulate materials was used in each case.

TABLE 1

Crushing Strength in Newtons of Heat Treated Pellets.

|  | Treatment Temperature, ° C. | | | |
| --- | --- | --- | --- | --- |
| Binder Material. | 20* | 500 | 800 | 1,000 |
| 10% Calcium Silicate. | 1410 | 1230 | 480 | 350 |
| 7% High-alumina cement. | 890 | 770 | 670 | 590 |
| Optimum Mixture. | 2100 | 1760 | 1650 | 1920 |

*This refers to the crushing strength of the pellets after curing and before heating.

The crushing strength at elevated temperatures indicates that the pellets of the present invention are suitable for use in blast furnaces and DRI furnaces, amongst other applications.

Using pellets incorporating the "Optimum Mixture" as set out above, metallization tests were carried out in a reducing atmosphere in an 8 cm diameter tube furnace. The pellet was heated in a gas containing 4.2% hydrogen, 2.1% carbon monoxide, and 93% argon at a flow rate of 600 ml/min. The furnace was heated from room temperature to about 1450° C. at a rate of 7° C./min, and then held at this temperature for 15 minutes. The furnace was then allowed to cool, and the remains of the pellet recovered. At 1350° C. the pellet was observed to melt, resulting in the formation of a slag phase and liquid metal. At 1450° C. the molten metal and slag separated forming a small ingot and marble. The metal recovery is set out in Table 2.

TABLE 2

Metal Recovery From Cast Pellets.

| Feed Pellet | | Product | | Recovery Rate | |
| --- | --- | --- | --- | --- | --- |
| Weight: | 13.37 g | Weight: | 9.12 g | Weight loss: | 31.8% |
| Fe content: | 60.7% | Fe: | 7.60 g | Fe: | 93.7% |
| Slag content: | 11.4% | Slag: | 1.52 g | Slag: | 99.3% |

The slag materials contained by weight Al 2.8%, Si 6.3% and Ca 2.3%.

A similar test was carried out on pellets in which 15 parts by weight of powdered coal had been added to the "Optimum Mixture". The coal used was bituminous coal, containing 8.93% ash, 56.23% carbon and 34.8% volatile matter, ground to pass a 35 mesh standard screen. At 1200° C. the pellet showed no indication of sintering or slag formation, even though at least some of the ferrous materials reduce to iron at this temperature. Most of the ferrous values were reduced to iron at 1350° C., and metallization was complete at 1450° C. However, there was no liquid metal formation, and the metal and slag did not separate. The iron values in the pellet were recovered as spongy iron. Analysis of the cooled pellet remains gave the information in Table 3; all percentages are by weight, and LOI is loss on ignition.

TABLE 3

Metal Recovery From Cast Pellets Containing Coal.

| Pellet | | Spongy Iron | | Recovery Rate | |
|---|---|---|---|---|---|
| Weight: | 10.87 g | Weight: | 7.04 g | Weight loss: | 35.2% |
| Fe: | 50.6% | Fe: | 77.9% | Fe recovery: | 99.5% |
| $Al_2O_3$: | 3.19% | $Al_2O_3$: | 4.56% | Slag recovery: | 91.4% |
| $SiO_2$: | 6.90% | $SiO_2$: | 7.94% | $SiO_2$ Recovery: | 74.7% |
| CaO: | 4.60% | CaO: | 5.88% | CaO Recovery: | 82.0% |
| LOI: | −15.7% | LOI: | +33.5% | | |

The pellet loss on ignition is mainly due to burn out of the coal, and the spongy iron weight gain is due to oxidation of the iron to mainly haematite.

We claim:

1. A solid shaped body comprising from about 70% to about 97% of iron particulate material bonded together with from about 3% to about 30% of fully hydrated and set high-alumina cement.

2. A solid shaped body comprising from about 75% to about 97% of iron particulate material and from about 5% to about 25% of a particulate carbonaceous material bonded together with from about 3% to about 15% of fully hydrated and set high-alumina cement.

3. A solid shaped body according to claim 1 wherein the iron particulate material consists of a mixture of coarse particles having a size range of from about 0.1 mm to about 6 mm, and fine particles having a size of less than 0.1 mm.

4. A solid shaped body according to claim 2 wherein the iron particulate material consists of a mixture of coarse particles having a size range of from about 0.1 mm to about 6 mm, and fine particles having a size of less than 0.1 mm.

5. A solid shaped body according to claim 3 wherein the iron particulate material includes up to 20% by weight of coarse particles having a size of about 0.1 mm to about 6 mm, the remainder being fine particles having a size of less than about 0.1 mm.

6. A solid shaped body according to claim 4 wherein the iron particulate material includes up to 20% by weight of coarse particles having a size of about 0.1 mm to about 6 mm, the remainder being fine particles having a size of less than about 0.1 mm.

7. A solid shaped body according to claim 1 wherein the iron particulate material includes at least one member chosen from the group consisting of iron ore fines, iron ore sinter fines, EAF dust, BOF dust, and mill scale.

8. A solid shaped body according to claim 2 wherein the iron particulate material includes at least one member chosen from the group consisting of iron ore fines, iron ore sinter fines, EAF dust, BOF dust, and mill scale.

9. A solid shaped body according to claim 1 containing:
   from about 70% to about 97% by weight iron particulate material
   from about 3% to about 30% fully hydrated and set high-alumina cement,
   together with, based on the total weight of iron particulate material and high-alumina cement:
   from 0% to about 5.0% bentonite and from 0% to about 5.0% supplementary cementing materials as designated in CSA Standard A23.5; and
   from 0% to about 3% by weight based on the total weight of the mixture of a water reducing strength increasing admixture for concrete;
   wherein the iron particulate material includes from about 3% to about 80% by weight of coarse particles having a size range of from about 0.1 mm to about 6 mm, and from about 20% to about 97% by weight of fine particles having a size of less than 0.1 mm.

10. A solid shaped body according to claim 9 wherein the supplementary cementing material is silica fume.

11. A solid shaped body according to claim 2 wherein the powdered carbonaceous material comprises about 15 parts per weight of the dry mixture.

12. A solid shaped body according to claim 2 wherein the powdered carbonaceous material is ground coal or ground coke.

* * * * *